(No Model.) 6 Sheets—Sheet 1.
A. RACK.
MALT KILN.
No. 441,699. Patented Dec. 2, 1890.
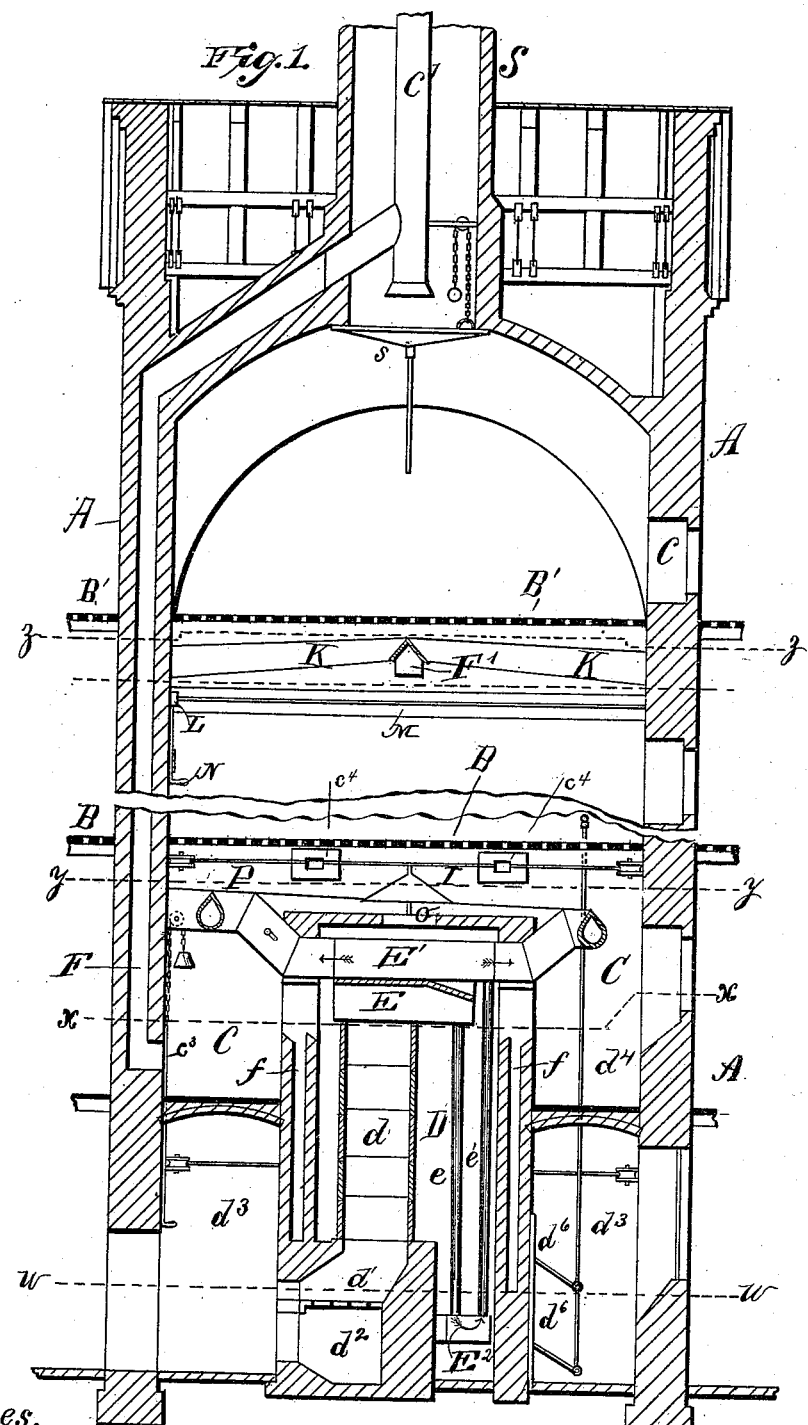
Witnesses.
Inventor.
Adolf Rack.
Atty.

(No Model.) 6 Sheets—Sheet 2.

A. RACK.
MALT KILN.

No. 441,699. Patented Dec. 2, 1890.

Witnesses.
Chas. W. Coubrye
B. W. Sommers

Inventor:
Adolf Rack.
Henry Orth
Atty.

(No Model.) 6 Sheets—Sheet 3.

A. RACK.
MALT KILN.

No. 441,699. Patented Dec. 2, 1890.

Witnesses:
Henry J. Dietrich
B. W. Sommers

Inventor:
Adolf Rack,
per Henry Ott
Attorney (No Model.) 6 Sheets—Sheet 4.

A. RACK.
MALT KILN.

No. 441,699. Patented Dec. 2, 1890.

Witnesses.
Chas. H. Conboys
B. W. Sommers

Inventor.
Adolf Rack
fr Henry Orth
Atty.

(No Model.)  6 Sheets—Sheet 5.

A. RACK.
MALT KILN.

No. 441,699. Patented Dec. 2, 1890.

Witnesses:
Henry G. Dieterich
B. W. Sommers

Inventor:
Adolf Rack,
per: Henry Orth
Attorney.

(No Model.) 6 Sheets—Sheet 6.

A. RACK.
MALT KILN.

No. 441,699. Patented Dec. 2, 1890.

Witnesses
Inventor:
Adolf Rack,
Henry Orth
atty.

UNITED STATES PATENT OFFICE.

ADOLF RACK, OF VIENNA, AUSTRIA-HUNGARY.

MALT-KILN.

SPECIFICATION forming part of Letters Patent No. 441,699, dated December 2, 1890.

Application filed March 6, 1890. Serial No. 342,943. (No model.) Patented in Germany February 22, 1889, No. 49,369, and in Austria-Hungary September 29, 1889, No. 20,458 and No. 39,480.

*To all whom it may concern:*

Be it known that I, ADOLF RACK, a subject of the Emperor of Austria-Hungary, residing at Vienna, in the Austrian Empire, have invented certain new and useful Improvements in Malt-Kilns, (for which I have obtained Letters Patent in Austria-Hungary, No. 20,458 and No. 39,480, dated September 29, 1889, and in Germany, No. 49,369, dated February 22, 1889;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 2:
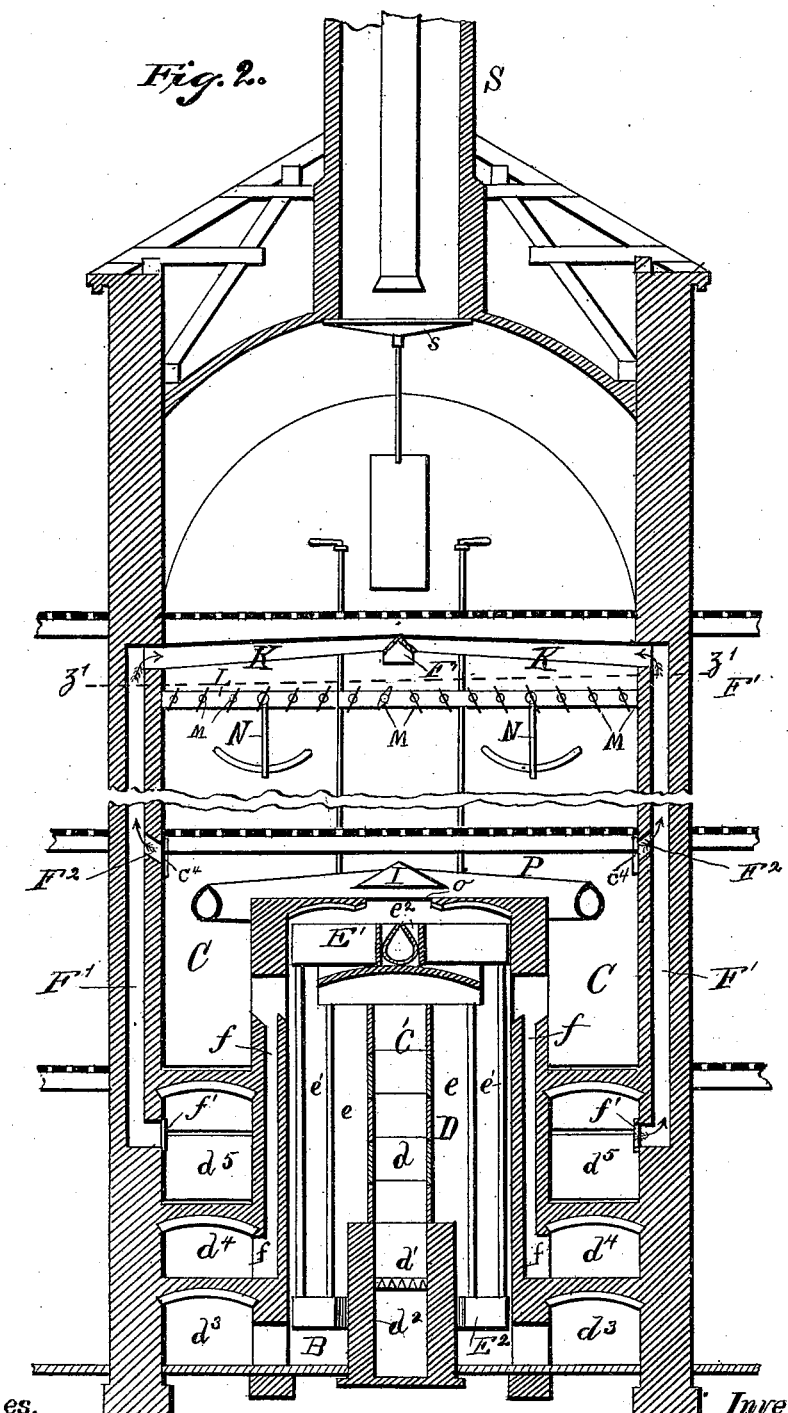
Figure 3:
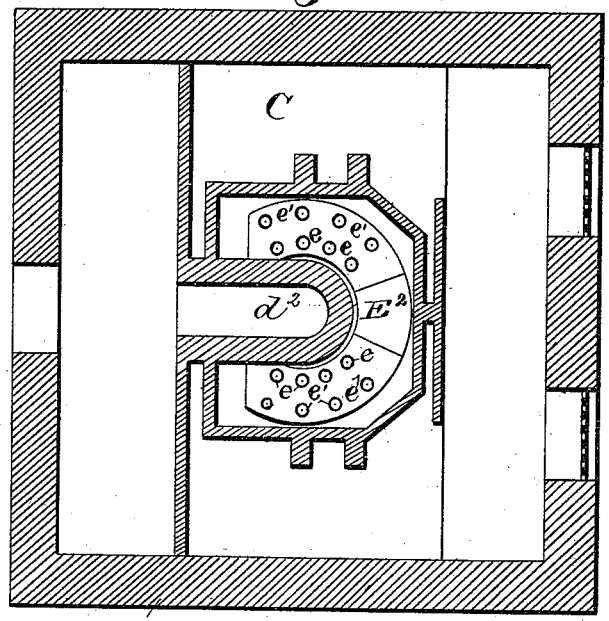
Figure 4:
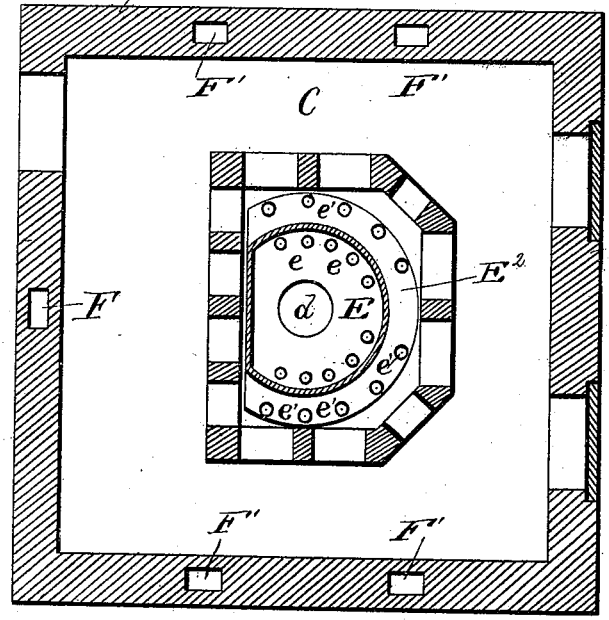
Figure 6:
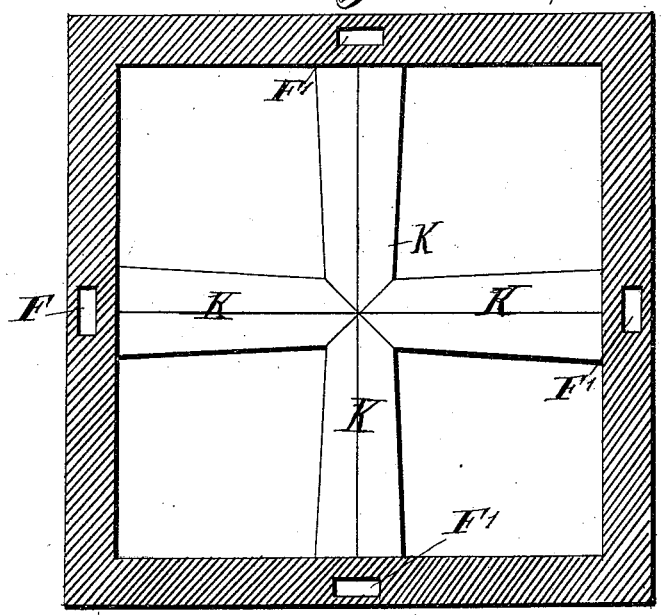
Figure 7:
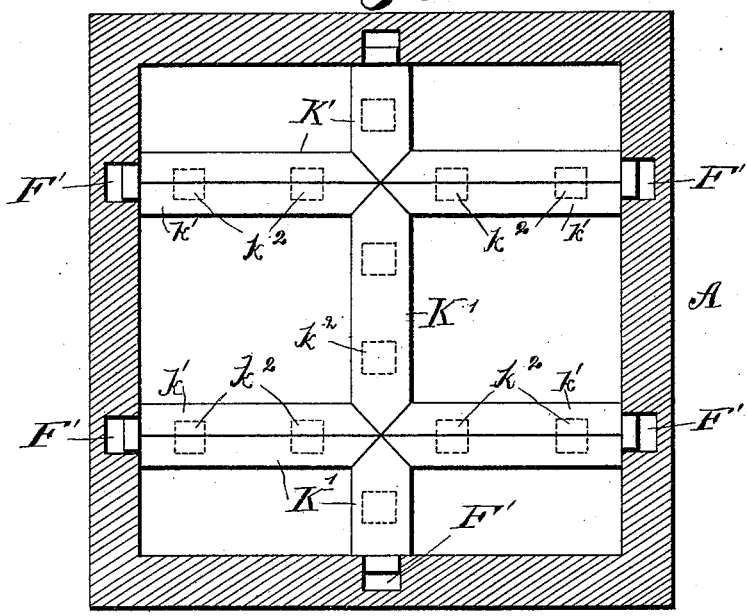
Figure 8:
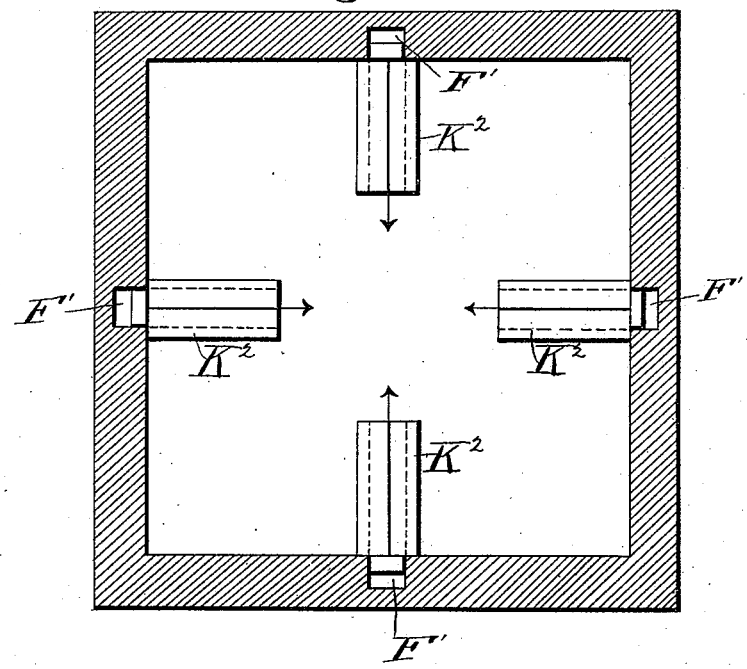
Figure 9:
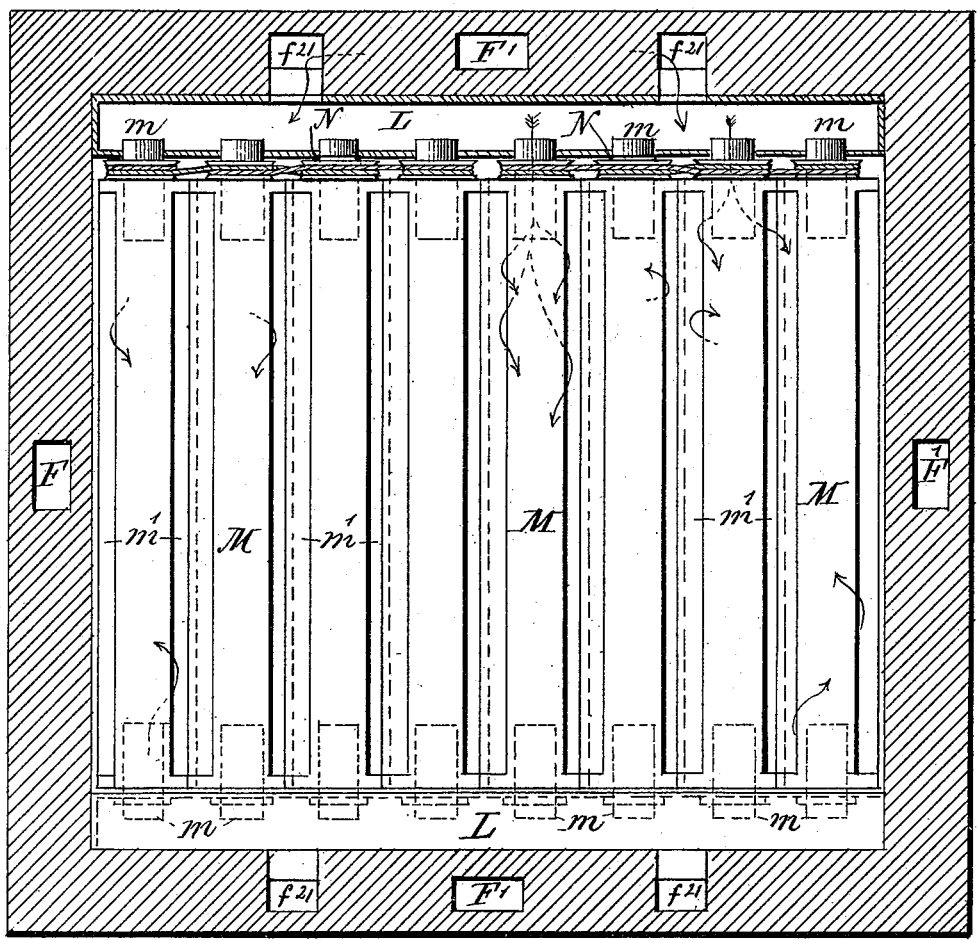
Figure 10:
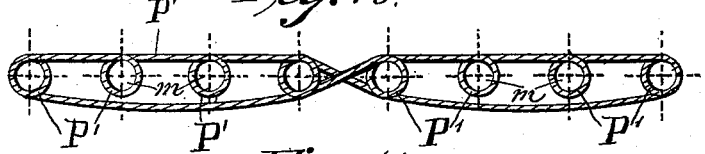
Figure 11:
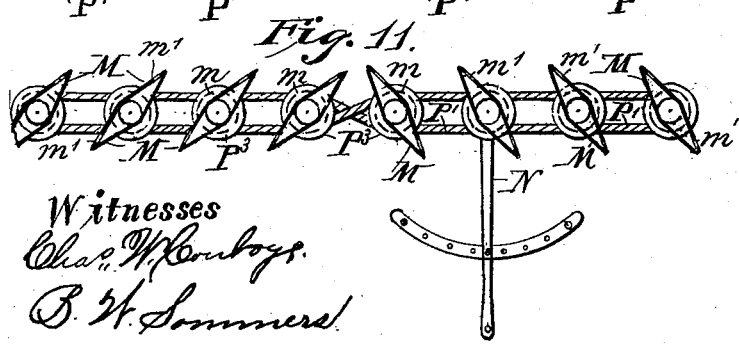
Figure 12:
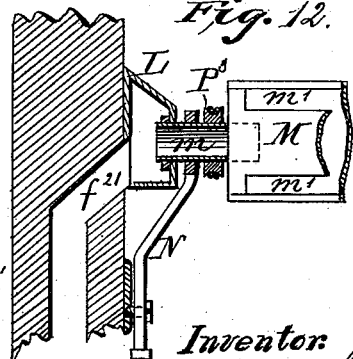

Referring to the drawings, Figures 1 and 2 are vertical central sectional elevations taken at right angles to each other and illustrating a malt-kiln embodying my invention. Figs. 3, 4, 5, and 6 are horizontal sections taken, respectively, on lines $w\ w$, $x\ x$, $y\ y$, and $z\ z$ of Fig. 1. Figs. 7 and 8 are views similar to that shown in Fig. 6, illustrating modifications in the construction and arrangement of the heat-distributing pipes or flues. Fig. 9 is a section taken on line $z'\ z'$ of Fig. 2; and Figs. 10, 11, and 12 are detail views of the hollow-slat partition.

The invention relates to that class of malt-kilns in which the drying-floors are arranged one above the other. It is well known that malt should undergo a gradual desiccation and that the temperature of the desiccating or drying medium, which is usually heated air, should be increased as the desiccation progresses—that is to say, the temperature of the air admitted to the malt in an advanced state of desiccation should be higher than the temperature of the air admitted to the malt that is in a less advanced state of desiccation or to the green malt. To more conveniently effect this the kilns are constructed with superposed floors, the source of heat being located below the lower floor. The green malt is fed to the upper floor, and as desiccation proceeds is shifted from floor to floor until it reaches the lower floor, where the final desiccation takes place. In these kilns means are provided for regulating the temperature of the air supplied to the malt on the several superposed drying-floors and for allowing the air after passing through the malt and the moisture eliminated therefrom to escape into the atmosphere, a large proportion of the heat being unnecessarily wasted. On the other hand, the floors in these kilns are usually separated from one another by vaulted partitions, so that each drying-floor virtually forms a separate and independent kiln, which, when floor-space is available, may as well be arranged side by side.

This invention has for its object structural features whereby the heat heretofore wasted is or may be utilized, whereby the temperature of the heated air may be more readily controlled, and whereby the desiccation of malt may be carried out more rapidly and uniformly than is the case in kilns of the construction above referred to.

To these ends the invention consists in structural features and combinations of parts, as will now be fully described, reference being had to the drawings.

Referring more particularly to Figs. 1 to 6, inclusive, A indicates the kiln, of suitable general construction and having a plurality of superposed perforated drying-floors B B', the structure being broken through in Figs. 1 and 2, showing only the lower and upper drying-floors B and B', respectively, which will be all that is necessary to a full understanding of my improvements. Below the lower floor B is arranged the air-heating chamber C, in which is located a heater D, having a cylindrical fire-pot or combustion-chamber $d$, below which is the grate $d'$ and ash-pit $d^2$. The heater is preferably set or inclosed in brick-work, in which are formed the air-heating chambers or flues and the cold-air-supply flues, presently to be described. The fire-pot or combustion-chamber $d$ of the heater D is surmounted by two smoke boxes or drums E E', the upper smoke-box being of greater diameter than the lower one, and said smoke-boxes E E' have no direct communication with each other. Partly around the ash-pit $d^2$ of the heater is arranged in the form of a horseshoe, or substantially so, a third smoke-box $E^2$, that is connected with the smoke-box E by means of flues $e\ e$, forming diving-flues for the products of combustion entering the box E from the combustion-chamber or fire-pot d. The said smoke-box $E^2$ is connected by ascending flues $e'$ $e'$ with the upper smoke-box E′, so that the hot gases and products of combustion ascending to the smoke-box E from the furnace or heater D are caused to descend to the smoke-box $E^2$ and again to ascend to the smoke-box E′ through the tubular flues $e$ and $e'$, respectively, to more effectually utilize the heat.

Figure 5:
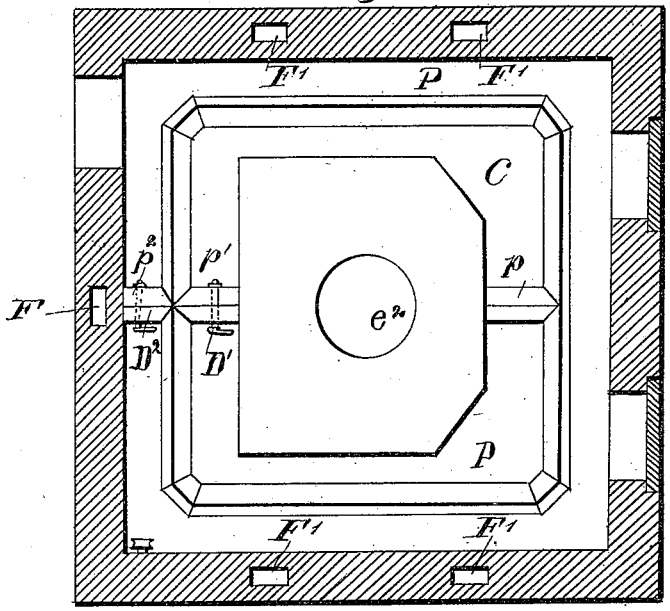

As shown in Figs. 2 and 5, the upper smoke-box E′ has an axial opening $e^2$ to more effectually give up its heat by radiation, a corresponding opening $o$ being formed in the roof of the brick-work for the escape of the heat, a conical damper and deflector I being used to regulate the outflow of hot air, as shown in Figs. 1 and 2. Around the upper smoke-box E′ is arranged the draft-pipe P, which is slightly inclined, said draft-pipe having the form of a rectangular coil, and is provided with three branches $p$ $p'$ $p^2$. The branches $p$ and $p'$ serve to connect the draft-pipe P to the smoke-box E′ at opposite sides, and the branch $p^2$ serves to connect said pipe with the draft-flue F. (See Fig. 5.) The branches $p'$ and $p^2$ of the draft-pipe P are each provided with a damper, (indicated by D′ $D^2$,) respectively, the object of which is to further increase the distance traversed by the hot gases and products of combustion, so that when the damper D′ is closed the said gases and products of combustion, coming from tubular flues $e'$ into the smoke-box E′, are compelled to pass through branch $p$ to pipe P, and there, dividing, flow along opposite sides of the smoke-box to branch $p^2$, and thence to the draft-flue.

The damper $D^2$, as will be readily understood, serves to regulate the draft, and when said damper and the damper D′ are open the gases and products of combustion will naturally take the more direct course through branches $p'$ $p^2$ to the draft-flue F.

From this description of the construction of the heater D and the flues through which the gases and products of combustion are or may be made to circulate it will be readily seen that approximately all of the heat evolved from the fuel is or may be utilized.

As shown in Fig. 1, the draft-flue F extends down to and is in direct communication with the hot-air chamber C, surrounding the upper part of the heater D, the flue-opening being normally closed by a damper $c^3$. Should the air-chamber C become too hot, it will only be necessary to more or less open the damper that closes the mouth of flue F and simultaneously therewith admit a larger volume of cold air to said chamber through the medium of devices hereinafter to be described. More or less of the air in chamber C will thus pass directly through the draft-flue F, a correspondingly less volume of air being supplied to the malt on one or more, or all, of the drying-floors, the temperature of such air being at the same time modified, according to the volume of cold air admitted to chamber C.

In the brick-work in which the furnace or heater is set are formed the cold and hot air flues $d^3$ $d^4$ $d^5$, the amount of cold air admitted through flues $d^3$ $d^4$ to flues $d^5$ being regulated by a damper or dampers $d^6$, Fig. 1. The flues $d^4$ communicate directly with the chamber C through flues $f$, while the flues $d^5$ communicate by flues F′ with the several drying-floors, the amount of cold air passing into flues F′ being regulated by dampers $f'$. Said flues F′ also communicate with the hot-air chamber C, the quantity of hot air admitted to the flues being regulated by dampers $d'$. It will thus be seen that the temperature of the air supplied to the floors may be readily controlled. The hot air from chamber C, ascending through the lower floor B and the malt thereon, may be allowed to ascend successively through each one of the succeeding floors, besides which the hot air may be supplied to the several floors above the lower floor through the branch flues $F^2$ and the volume of hot air supplied controlled through the medium of the dampers $c^4$, and the temperature of such hot air may be regulated by admission of colder air from the chamber or flue $d^5$ in communication with flue F′, and the volume of air supplied may be controlled by the dampers $f'$, provided for said flues F′, and I employ means, hereinafter to be described, for distributing the hot air under the several floors, as well as means for cutting off the direct flow of air from one floor to the other.

The draft-flue F is connected with a suitable chimney C′, inclosed in a stack S, that communicates with the upper drying-chamber B′, the mouth of the stack being closed by a suitable damper $s$, in the usual manner, and for well-known purposes.

The heat-distributing pipes may be constructed and arranged in many different ways; but in order to uniformly distribute the hot air under the drying-floors they should all be so arranged as to deliver the air over as great an area as possible.

In Figs. 1, 2, and 6 I have shown heat-distributing pipes K constructed in the form of an inverted V in cross-section. These pipes, or, more properly, hot-air ducts, are made tapering from their outer ends to their point of junction centrally of the drying-floor, and the said wider ends are secured over the mouth of the hot-air flues F′, so that as the hot air issues from said flues it is directed by the four branches $k$ of duct K toward the center of the chamber below the drying-floor, this air "overflowing," if I may so express it, the edges of the branches and rising thence to and through the perforated drying-floor. As shown in the drawings, the branches $k$ of the duct K incline upwardly from the outer end to their point of junction centrally below the perforated floor, in order to promote the flow of hot air toward that point. In Fig. 7 I have shown an arrangement of distributing-pipe K' in the form of a double cross and preferably triangular in cross-section and of equal area throughout, the branches k' being provided in their flat bottoms with two or more outlet-ports k², so that the hot air issuing from said ports will flow upwardly around the pipes to and through the perforated drying-floor above.

In Fig. 8 I have shown four short triangular pipes K² projecting toward the center of the kiln, so as to conduct the heat to that point.

In either construction of hot-air ducts or pipes the air is more uniformly distributed over the under surface of the drying-floors than would be the case if said ducts were absent, thus insuring a more uniform drying of the malt, requiring less labor in turning and shifting the same, and resulting in a better final product.

From what has been said above it will readily be seen that the hot air passing through the floors below the upper floor is free to ascend through the several floors. It is, however, frequently desirable that the vapor-laden air rising from the malt should not be allowed to pass through the malt, and to effect this I provide means for shutting off the flow of vapor-laden air, and to this end I have provided means that may also be utilized as hot-air conduits.

Referring now more particularly to Figs. 2, 9, 10, 11, and 12, below the heat-distributing ducts or pipes of each floor above the lower one I arrange on opposite sides of the kiln a duct L, preferably of heavy sheet metal, though other material may be used, said duct communicating with branch ducts $f^{21}$, leading to the hot-air flue F'. In these ducts L are journaled hollow slats M, of sheet metal, in the form of a lozenge in cross-section, having tubular journals m, that have their bearings in suitable openings of the ducts L. In the upper side of each slat and at opposite edges thereof is formed a longitudinal slot or port m' for the escape of the hot air, and the said slats are so arranged as that when they are turned to cut off the flow of air through a drying-floor the ports m' will face the said floor (see Fig. 9) with their contiguous edges overlapping each other, forming a false floor, each slat performing in a measure the function of a valve.

Any suitable means may be employed for imparting the necessary movement to the slats M. In practice I preferably divide the slats into two series, each series being operated by a lever N, adapted to be locked into the position to which it is moved by engaging a toothed sector or a sector-plate having holes for the reception of a pin projecting from or passing through the lever. The lever N is secured to one of the tubular journals m, Fig. 12, for the purpose of revolving one of the slats of a series. Upon each journal m is secured a grooved pulley $P^3$, around which is wound a cord or chain P', Figs. 10 and 11.

It is obvious that when the slat to which the lever N is connected is partially revolved in one direction all the other slats will revolve in a like direction.

Having now described my invention, what I claim, and desire to secure by Letters Patent, is—

1. In a malt-kiln, a plurality of superposed drying-chambers having perforated floors, a hot-air chamber below the lower drying-chamber, and hot-air flues in communication with said hot-air chamber and with the drying chamber or chambers above the lower one at a point below the perforated floor of said chamber or chambers, in combination with heat-distributing pipes or ducts connected with said hot-air flues and extending under the said perforated floor, substantially as and for the purposes specified.

2. In a malt-kiln, a plurality of superposed drying-chambers having perforated floors, a hot-air chamber below the lower drying-chamber, and hot-air ducts in communication with the said hot-air chamber and with the drying chamber or chambers above the lower one at a point below the perforated floors thereof, in combination with hot-air-distributing pipes or ducts connected with the hot-air flues and extending therefrom under the drying-floor, said pipes or ducts being constructed and adapted to discharge the hot air from the under side, substantially as and for the purposes set forth.

3. In a malt-kiln, a plurality of superposed drying-chambers provided with perforated floors, a hot-air chamber below the lower drying-chamber, and hot-air flues in communication with the said hot-air chamber and with the drying chamber or chambers above the lower one at a point below the perforated floor thereof, in combination with hot-air-distributing ducts having the form of an inverted V in cross-section, said ducts being open at bottom and extending from the discharge-port of the hot-air flues under said perforated floor, substantially as and for the purposes set forth.

4. In a malt-kiln, a plurality of superposed drying-chambers provided with perforated floors, a hot-air chamber below the lower drying-chamber, and hot-air flues in communication with the said hot-air chamber and with the drying chamber or chambers above the lower one at a point below the perforated floor thereof, in combination with hot-air-distributing ducts having the form of an inverted V in cross-section, said ducts being open at bottom and extending from the discharge-port of the hot-air flues under said perforated floor, the depth of said ducts being gradually reduced from the outer to the inner end thereof, substantially as and for the purposes set forth.

5. In a malt-kiln, a plurality of superposed drying-chambers provided with perforated floors, a hot-air chamber below the lower floors, and hot-air ducts connecting the hot-air chamber with the drying chamber or chambers above the lower one, in combination with a hot-air-distributing duct K, for said chamber or chambers, arranged below the floor thereof and consisting of a plurality of branches extending upwardly from the hot-air flues to the center of the chamber-floor, said branches having the form of an inverted V and being open at bottom, substantially as and for the purposes set forth.

6. In a malt-kiln, a plurality of superposed drying-chambers provided with perforated floors, a hot-air chamber below the lower floor, and valved hot-air ducts communicating with the hot-air chamber and with the drying chamber or chambers above the lower one at a point below the floors thereof, in combination with a false floor for said chambers composed of interconnected movable slats operating like blind-slats and arranged below the point of discharge of the hot air, and an actuating device for imparting motion to the slats, substantially as and for the purposes set forth.

7. In a malt-kiln, the combination, with the drying-chamber provided with a perforated floor and a source of hot-air supply, of a false floor composed of hollow revoluble slats adapted to operate like blind-slats and provided with hot-air-discharge ports, and a hot-air duct connected with the source of hot-air supply and with the hollow slats, substantially as and for the purposes set forth.

In testimony whereof I affix my signature in presence of two witnesses.

ADOLF RACK.

Witnesses:
RUDOLFORUS PLANK,
NETTIE S. HARRIS.